(12) United States Patent
Quirk (10) Patent No.: US 8,228,975 B2
(45) Date of Patent: *Jul. 24, 2012

(54) SYSTEM AND METHOD FOR PRE AND POST-TAP ZEROING

(75) Inventor: Jay Quirk, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 640 days.

This patent is subject to a terminal disclaimer.

(21) Appl. No.: 12/472,422

(22) Filed: May 27, 2009

(65) Prior Publication Data

US 2010/0303142 A1 Dec. 2, 2010

(51) Int. Cl.
*H03H 7/30* (2006.01)
*H03H 7/40* (2006.01)
*H03K 5/159* (2006.01)

(52) U.S. Cl. ........................................ 375/232; 375/231

(58) Field of Classification Search .................. 375/230, 375/233, 350, 232, 142, 341; 333/28 R, 333/16; 370/441, 295, 335
See application file for complete search history.

(56) References Cited

U.S. PATENT DOCUMENTS 4,575,857 A * 3/1986 Murakami ..................... 375/230
2010/0020860 A1* 1/2010 Dai et al. ....................... 375/231

* cited by examiner

*Primary Examiner* — David C. Payne
*Assistant Examiner* — Wednel Cadeau
(74) *Attorney, Agent, or Firm* — Law Office of Gerald Maliszewski; Gerald Maliszewski (57) ABSTRACT

A system and method are provided for zeroing pre and post-tap settings in a link partner using a plurality of voltage gain taps. The method provides a link partner (LP) transmitter. A network-connected local device (LD) selects an LP pre-tap or post-tap. The LD also chooses a zero gain setting for the selected LP tap. In a first iteration, the LD directs the LP to decrease the difference between the selected tap gain setting and the zero setting by 1 step. If a limit signal is not received by the LD, the LP is directed to maximally increase the center tap gain setting until a limit signal is received. The iterations are continued until a limit signal is returned in response to the LD directing the LP to decrease the difference between the selected tap gain setting and the zero setting.

8 Claims, 13 Drawing Sheets

SYSTEM AND METHOD FOR PRE AND POST-TAP ZEROING

BACKGROUND OF THE INVENTION

1. Field of the Invention

This invention generally relates to communication system link parameters and, more particularly, to a system and method for zeroing the gain level of a selected tap in a multi-tap transmitter, using commands from a communicating receiver.

2. Description of the Related Art

IEEE 802.3, Clause 72 defines a protocol, referred to hereafter as KR Training, to be used for a local device (LD) to adjust three different transmitter taps of a link partner (LP): the center tap, the post cursor tap (post-tap), and the precursor tap (pre-tap). The center tap settings are always a positive value, while the post cursor and precursor taps may be set to positive or negative values. When using KR Training to manipulate transmitter taps, three factors serve to limit the range of the transmitter taps. The first factor is the physical limit of the transmitter taps, referred to herein as the static limit. This limit is unique to each transmitter tap and is not dependent upon the value of the other transmitter taps. The other two factors are dynamic limits, in that these limits are dependent upon the current value of all the transmitter taps. One dynamic factor is the maximum swing voltage. This is the maximum voltage allowed by the transmitter. The output signal through the combination of transmitter taps must not exceed this voltage. The final factor limiting the transmitter taps is the minimum steady state voltage. This is the minimum voltage allowed by the transmitter. The center tap reduced by the absolute value of the post and pre cursor taps must not fall below this voltage.

For instance, reducing the precursor tap can cause the differential voltage resulting from combining all of the taps to reach the maximum limit. Once the combined maximum for all the taps is reached, the center tap cannot be increased, nor can the post cursor tap or pre-cursor tap be decreased. A tap change request can only change the value of a (requested) coefficient. The transmitter does not adjust the center tap, for example, in response to a pre/post cursor tap request.

Figure 1:
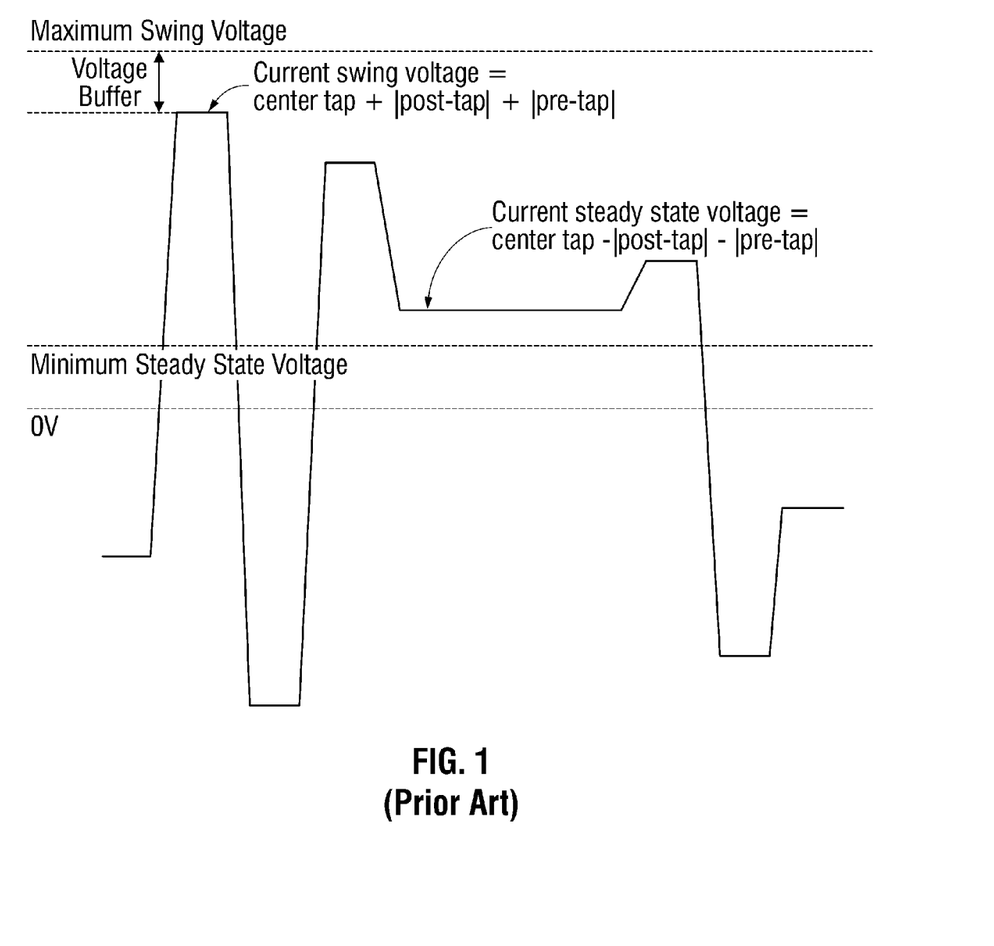
FIG. 1 is a diagram depicting the maximum swing voltage and minimum steady state voltage limits (prior art).

FIG. 1 is a diagram depicting the maximum swing voltage and minimum steady state voltage limits (prior art). KR Training provides three possible transmitter responses to any tap request, they are: maximum, minimum, and updated. The maximum and minimum statuses indicate that the transmitter has been adjusted to reach a static or dynamic limit. Further, the maximum/minimum response gives no indication of whether the request was actually performed. That is, response may be the result of a tap change being performed, or if the transmitter was already in a limit condition, the response may be the result of no tap change.

During KR Training, it may be desirable to set the gain setting for a transmitter tap to zero. There are no status messages within the KR Training protocol to indicate when the zero setting of a transmitter tap has been reached. There is a tap request known as PRESET that may be sent by the LD to command the LP to set the center tap to its maximum value, and its pre and post-taps to zero. However, setting both the pre and post-taps of the LP to zero may not be feasible, or desired by the LD.

It would be advantageous if there was a methodology for individually setting the pre and post-taps of an LP transmitter to a zero gain setting.

SUMMARY OF THE INVENTION

Disclosed herein are a system and method to resolve ambiguity in the transmitter tap status of a link partner (LP) during KR Training, as defined in IEEE 802.3 clause 72. Clause 72 defines a protocol of coefficient and status messages that a local device (LD) can utilize to adjust a LP's transmitter taps. The LD uses these messages to optimize the LP's transmitter for use in a link with the LD's receiver.

It is assumed that the best results are obtained by keeping the LP transmitter at the maximum setting. This is best done by ensuring that the center tap is at its maximum setting given the state of the other taps. Therefore, the tap adjustment algorithm focuses on requests for moving the pre and post-taps. The center tap is moved to support the pre and post-tap movements and is typically maintained at its maximum possible setting. In one aspect, the pre and post-tap can be set to a zero setting with a set of iterative commands that drive the center tap to its maximum setting, and move the selected (pre or post-tap) towards the zero setting. When, the selected tap movement generates a limit signal, the LD can determine that the zero setting has been reached.

Accordingly, a method is provided for zeroing pre and post-tap settings in a link partner using a plurality of voltage gain taps. The method provides an LP transmitter having a signal input, and a plurality of parallel selectable voltage gain taps connected to the signal input. The taps include a non-delayed pre-tap, a center tap with a delay of one unit, and a post-tap with a delay of 2 units. The LP transmitter has a network-connected output to supply the sum of the taps. A network-connected LD selects an LP pre-tap or post-tap. The LD also chooses a zero gain setting for the selected LP tap. In a first iteration, the LD directs the LP to decrease the difference between the selected tap gain setting and the zero setting by 1 step. If a limit signal is not received by the LD, the LP is directed to maximally increase the center tap gain setting until a limit signal is received. The iterations are continued until a limit signal is returned in response to the LD directing the LP to decrease the difference between the selected tap gain setting and the zero setting. In one aspect, the messages sent from the LD are in accordance with the IEEE 802.3, Clause 72 training procedure.

Additional details of the above-described method, and an LD system for zeroing the pre and post-tap settings in an LP transmitter using a plurality of voltage gain taps, are provided below.

DETAILED DESCRIPTION

Figure 2:
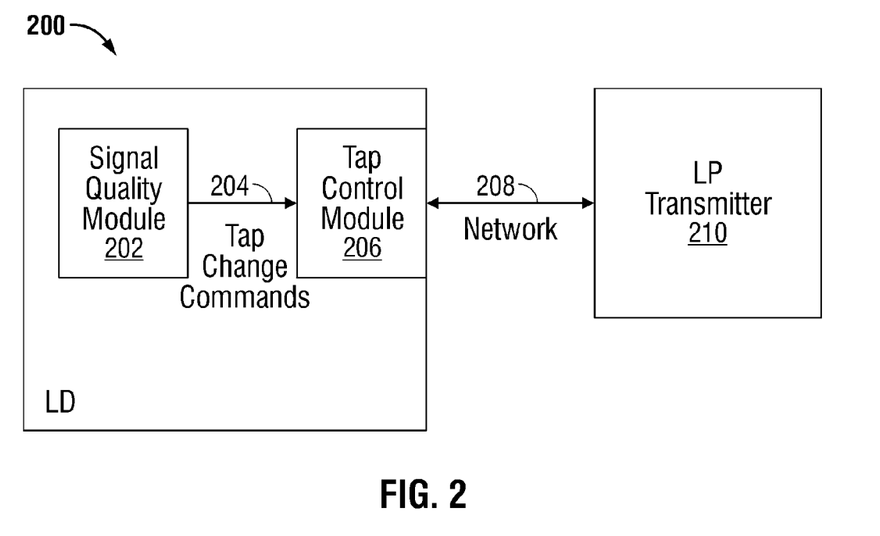
FIG. 2 is a schematic block diagram of a local device (LD) system for ordering tap setting modifications in a link partner (LP) using a plurality of voltage gain taps, while avoiding minimum and maximum limitations.

FIG. 2 is a schematic block diagram of a local device (LD) system for ordering tap setting modifications in a link partner (LP) using a plurality of voltage gain taps, while avoiding minimum and maximum limitations. The system 200 comprises an LD signal quality module 202 having an output on line 204 to supply either pre-tap or post-tap change commands. An LD tap control module 206 has an input to accept the tap change command and a network interface on line 208 to supply a sequence of tap modification signals to an LP transmitter 210. In one aspect, the LD tap control module sends tap change commands in accordance with the IEEE 802.3, Clause 72 training procedure.

It should be understood that the LD device is a transceiver including a receiver section (not shown), and that the LD device typically includes upper and lower layers (not shown), as expressed by the International Organization for Standardization (ISO) 7-layer model. It should also be noted that the linkage between the LD and LP is bi-directional, and that the LP device may requests changes in the transmitter tap settings of the LD.

Figure 3:
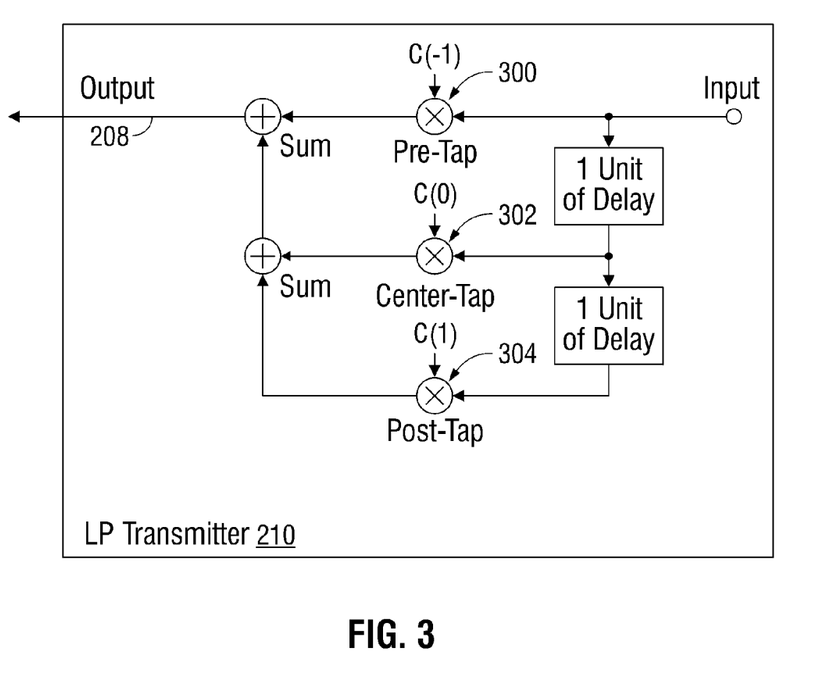
FIG. 3 is a more detailed schematic block diagram of the LP transmitter of FIG. 2.

FIG. 3 is a more detailed schematic block diagram of the LP transmitter of FIG. 2. The LP transmitter 210 has a plurality of parallel selectable voltage gain taps connected to a signal input, including a non-delayed pre-tap 300, a center tap 302 with a delay of one unit, and a post-tap 304 with a delay of 2 units. The LP transmitter 210 has a network-connected output on line 208 to supply the sum of the taps. It should be understood that the LP device is a transceiver including a receiver section (not shown), and that the LP device typically includes upper and lower layers (now shown).

Contrasting FIGS. 2 and 3, the LD tap control module 206 sends a sequence of tap modification signals, directing the LP transmitter 210 to change the gain setting of selected tap in the desired direction of modification, and as a final step, maximally increase the center tap gain settings until a limit signal is received. It should be understood that only one tap can only be modified per each LD instruction, and that each tap adjustment need not be performed in a single step. Thus, the process of changing the selected step in the desired direction may require a series of instructions by the LD, where each instruction is followed by a reply from the LP of either maximum/minimum limit or updated (no limit encountered). Likewise, the process of maximally increasing the center tap, until a (maximum/minimum) limit signal is obtained, may require a series of LD instructions, as the center tap may be incremented in steps of one unit.

In one aspect, the LD signal quality module 202 may send a message to decrease the difference between the selected tap gain setting and a zero tap setting. Then, the LD tap control module 206 sends a sequence of tap modification signals including directions to decrease the difference between the selected tap gain setting and the zero setting a second number of steps, followed by directions to maximally increase the center tap gain settings until a limit signal is received.

Figure 5A:
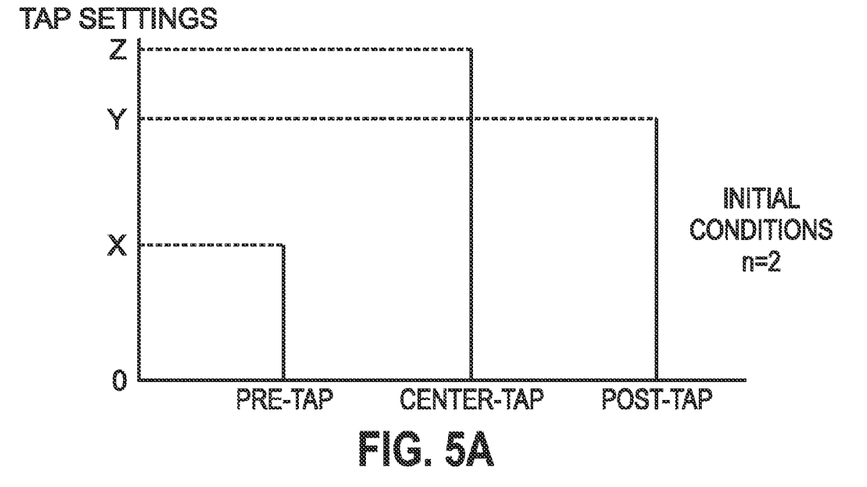
FIGS. 5A through 5E represent an exemplar process for decreasing the post-tap setting is steps, where n=2.
Figure 5B:
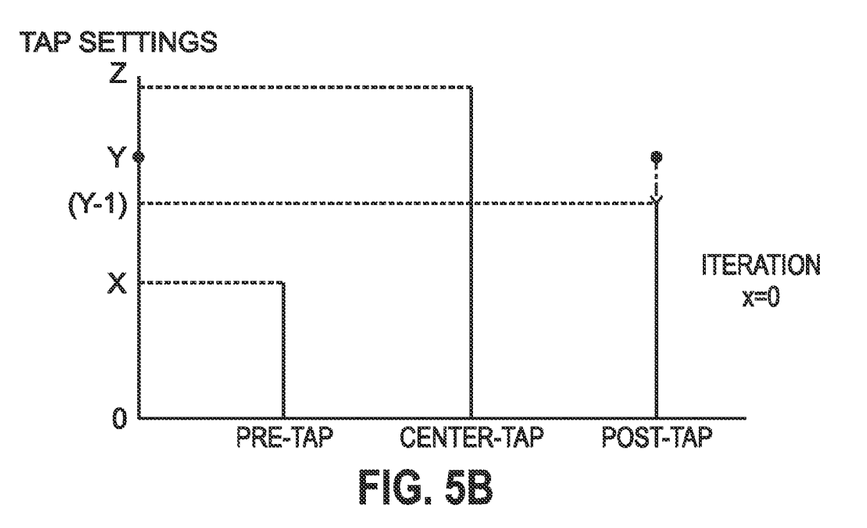
Figure 5C:
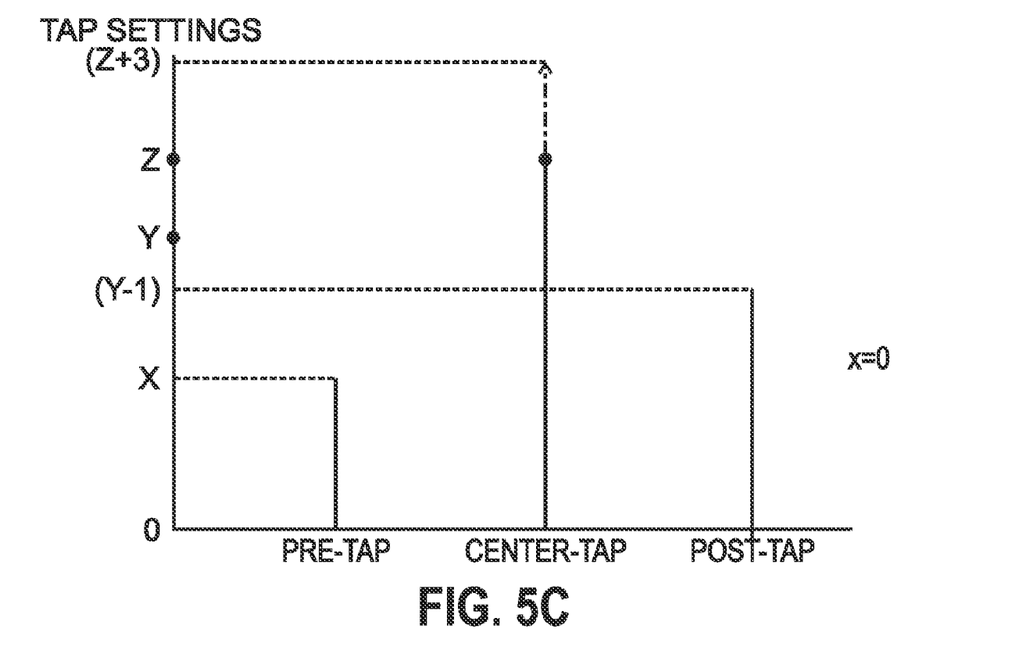

FIGS. 5A through 5E represent an exemplary process for decreasing the post-tap setting n steps, where n=2. In this example, the second number of steps is equal to 1, the post-tap is selected, and n=2. In FIG. 5A the LD directs the LP to decrease the difference between the selected tap (post-tap) gain setting and a zero tap setting n number of steps, where $n \geq 1$ and x is initially=zero. In FIG. 5B the selected (post) tap difference is decreased 1 step in iteration x. The post tap setting is decreased to (Y−1) from Y. Continuing iteration x, in FIG. 5C the center tap gain is maximally increased. As shown, the center tap setting has been changed from Z to (Z+3). Then, the LD tap control module adds 1 to x, and if x is not equal to n, directs the LP to perform another iteration.

Figure 5D:
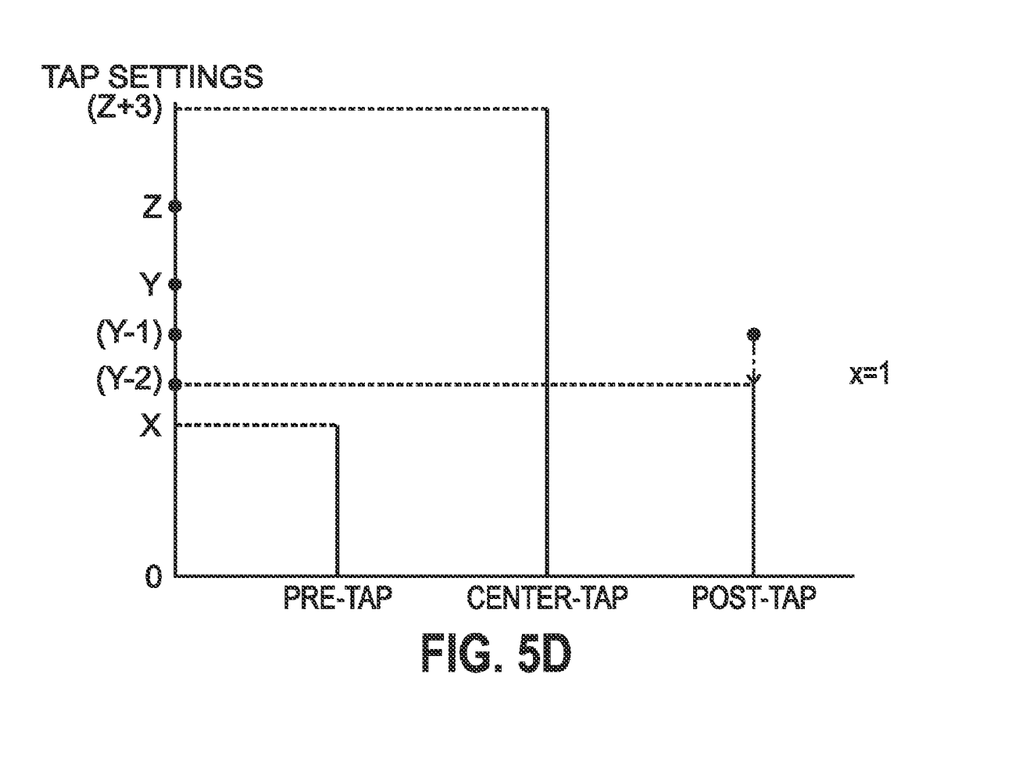
Figure 5E:
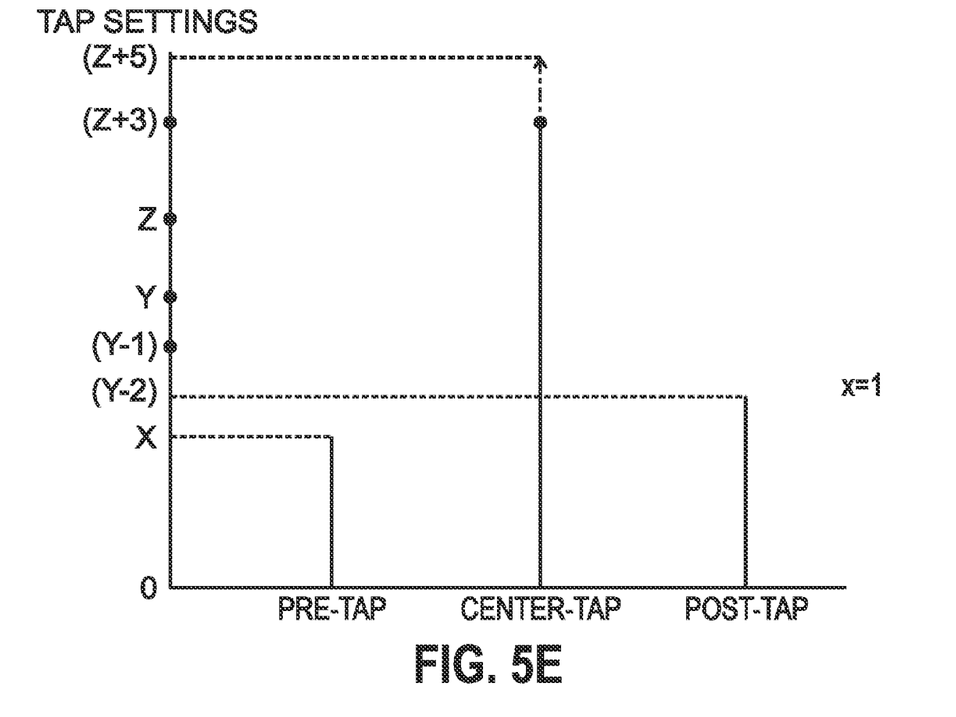

Since x (1) is not equal to n (2), another iteration is performed. In FIG. 5D the post-tap setting is decreased from (Y−1) to (Y−2). Then, in FIG. 5E the center tap gain setting is maximally increased from (Z+3) to (Z+5). At the end of this iteration, 1 is added to x. Since x now equals n, the tap adjustment process is complete.

Once the tap adjustments are made and the training procedure completed, the LP and LD units may communicate Ethernet data at a rate of 10 gigabit per second (10G) or 1G. It should be understood that the actual data rates may be higher or lower than 1G and 10G to line coding, e.g., 64B/66B for 10G. It should also be understood however, that the above-described system is not necessarily limited to any particular message protocol or data rate.

Returning to FIG. 2, an LD system will be described for zeroing the pre and post-tap settings in an LP transmitter using a plurality of voltage gain taps. As above, the system 200 comprises an LD signal quality module 202 having an output on line 204 to supply a zero setting command for either the LP pre-tap or the LP post-tap. The LD tap control module 206 has an input on line 204 to accept the zero setting command. The LD tap control module has a network interface on line 208 to supply a sequence of tap modification signals to an LP transmitter 210 having a plurality of parallel selectable voltage gain taps. As depicted in FIG. 3, the voltage gain taps are connected to a signal input, and include a non-delayed pre-tap 300, a center tap 302 with a delay of one unit, a post-tap 304 with a delay of 2 units, and a network-connected output on line 208 to supply the sum of the taps.

Returning to FIG. 2, the LD tap control module 206 sends a sequence of tap modification signals with the following directions. In a first iteration, decrease the difference between the selected tap gain setting and the zero setting by 1 step. If a limit signal is not received by the LD tap control module 206, the LP 210 is directed to maximally increase the center tap gain setting until a limit signal is received. These iterations are continued until a limit signal is returned in response to the LD tap control module directing the LP to decrease the difference between the selected tap gain setting and the zero setting. When, the limit signal is returned in response to the LD tap control module directing the LP to decrease the difference between the selected tap gain setting and the zero setting, it is known that the selected tap is at its zero setting.

Figure 6A:
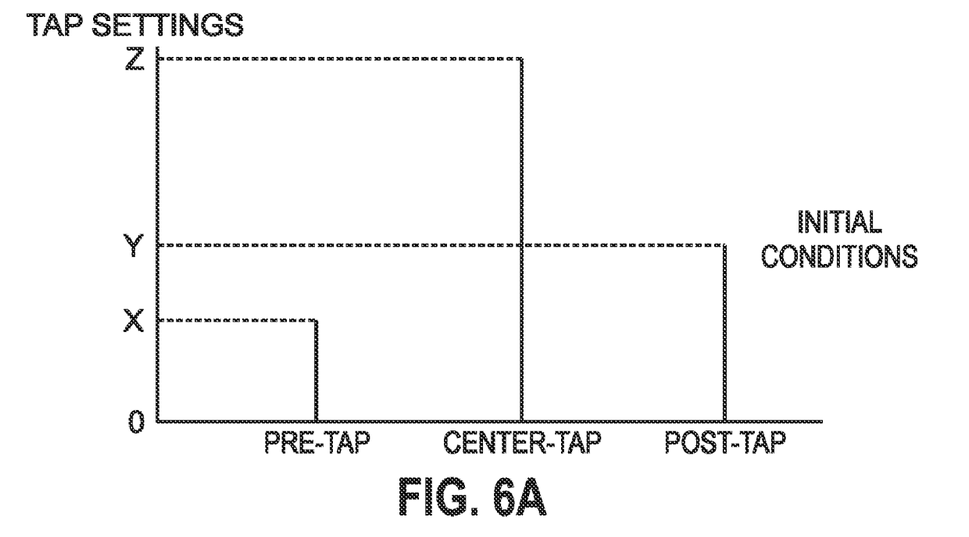
FIGS. 6A through 6F are diagrams depicting an exemplar process for determining the zero setting for a selected tap.
Figure 6B:
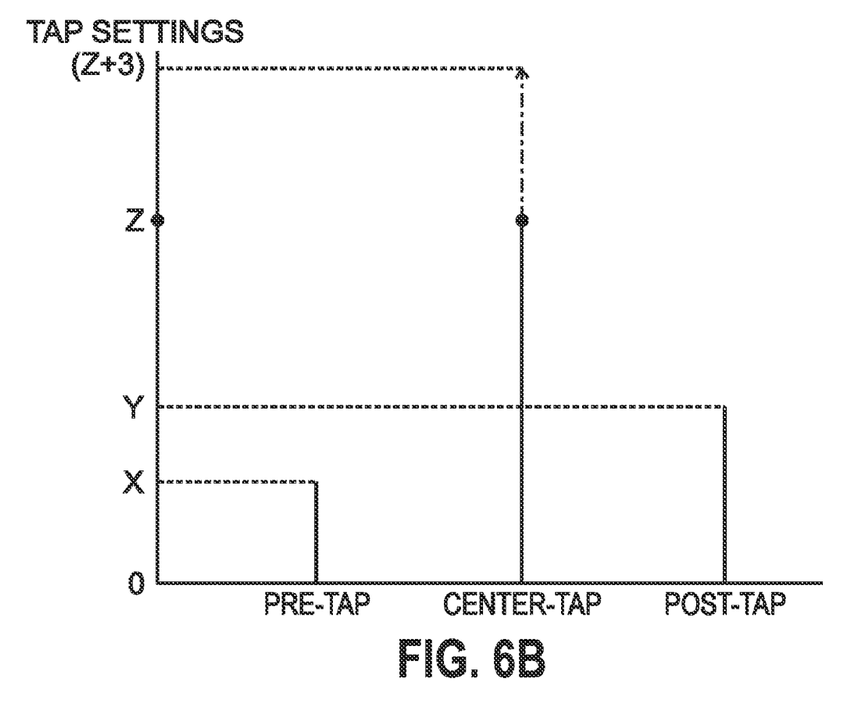
Figure 6C:
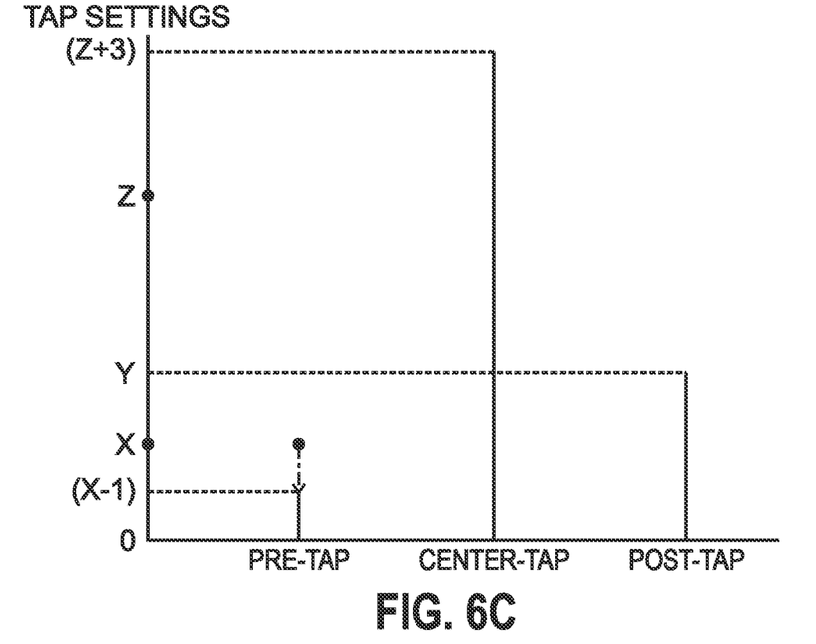
Figure 6D:
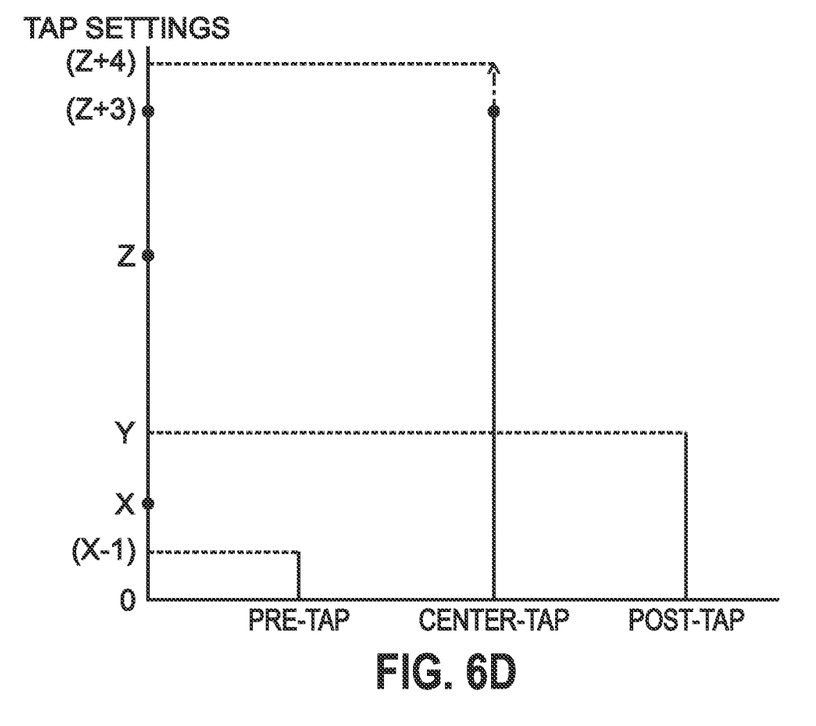
Figure 6E:
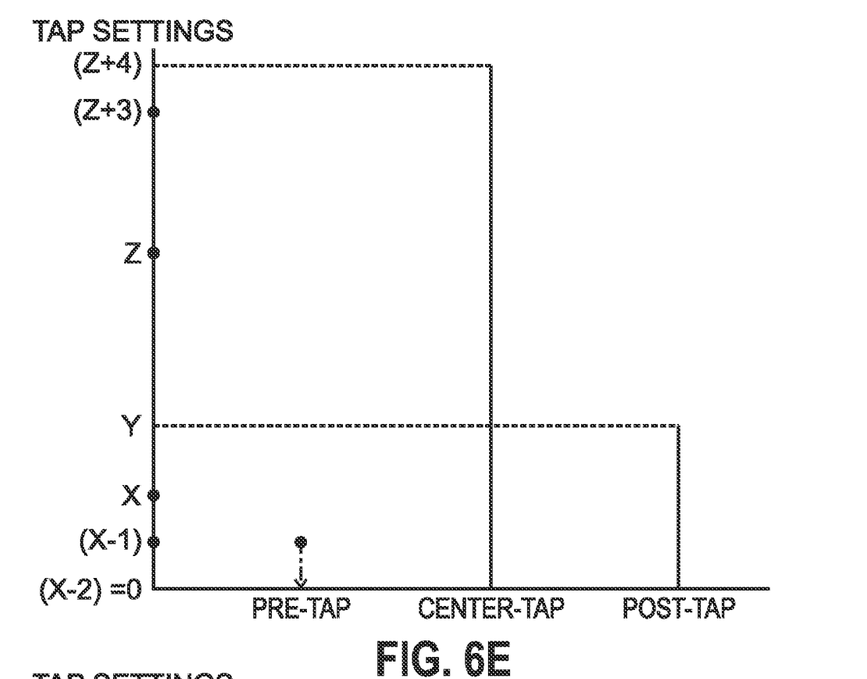
Figure 6F:
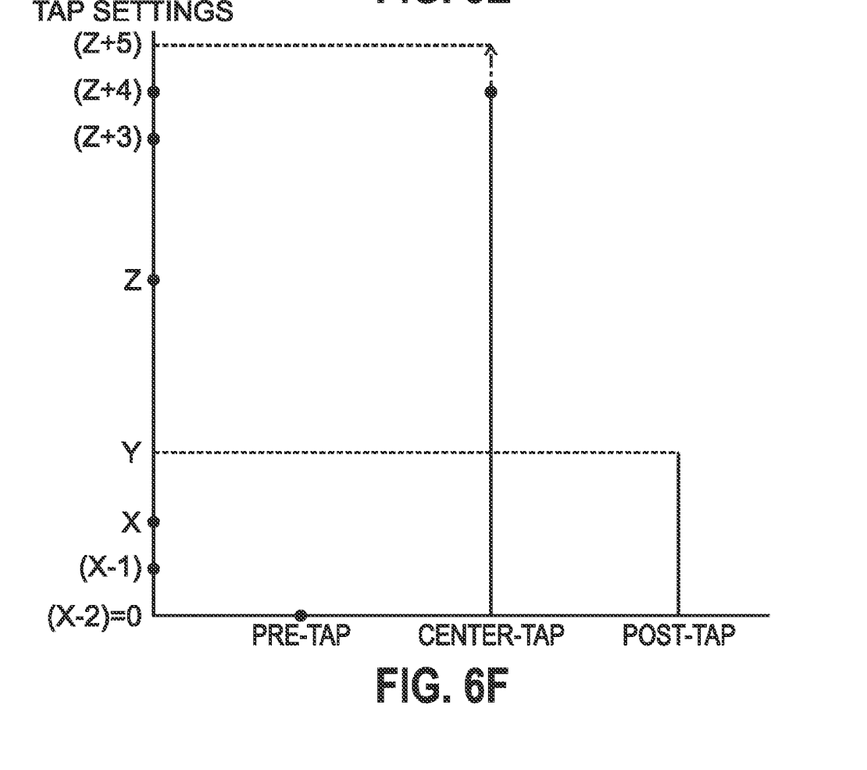

FIGS. 6A through 6F are diagrams depicting an exemplary process for determining the zero setting for a selected tap. Assuming that the pre-tap is selected, in FIG. 6A the pre-tap and center tap gain settings, X and Z respectively, are unknown. In FIG. 6B, the LD directs the LP to increase the center tap gain setting until the limit is reached (e.g., Z+3). In FIG. 6C, the pre-tap is decreased one step, to (X−1). Since a limit signal is not returned, another iteration is performed. In FIG. 6D the LD directs the LP to increases the center tap gain setting until the limit is reached (e.g., Z+4). In FIG. 6E, the pre-tap is decreased one step, to (X−2), which is the zero setting in this example. Since a limit signal is not returned, another iteration is performed. In FIG. 6F the LD directs the LP to increases the center tap gain setting until the limit is reached (e.g., Z+5). Then, an attempt is made to decrease the pre-tap by one step, to (X−3), which is a negative value and less than the zero setting. Since a limit signal is returned, the pre-tap is not moved and the LD determines that the pre-tap is now at the zero setting. Note: a negative pre or post-tap value is not considered a zero setting. Alternately stated, limit signals can be generated as a result of either positive or negative tap gain settings.

Typically, although the LD may not know the value of the selected tap at the start of the above-describe zero gain setting process, the direction in which the selected tap must be driven is known. That is, if the selected tap has a positive gain value, this information is communicated to the LD in accordance with IEEE 802.3, Clause 72 training procedure, and the LD "knows" enough to subtract gain voltage steps to reach the zero setting. However for other systems, it may be necessary to determine the direction in which the selected tap should be moved.

In a system where the selected tap polarity is unknown, the LD tap control module determines the current polarity of the selected tap and directs the LP to decrease the absolute value of the difference between the selected tap gain setting and the zero setting. Returning to FIG. 2, the LD tap control module determines the current polarity of the selected tap by directing the LP to maximally increase the center tap gain setting until a limit signal is received, and then directs the LP to move the gain setting of the selected tap one step with respect to a first polarity (e.g. increase gain). If a limit signal is not received, it is determined that the first polarity is in the direction of the zero setting.

If a limit signal is received in response to directing the LP to move the gain setting of the selected tap one step with respect to the first polarity, then the LP is directed to move the gain setting of the selected tap one step with respect to a second polarity, opposite to the first polarity. If the limit signal is not received, it is determined that the second polarity is in the direction of the zero setting.

If a limit signal is received in response to directing the LP to move the gain setting of the selected tap one step with respect to the second polarity, it is determined that the current gain setting of the selected tap is the zero setting.

Figure 7A:
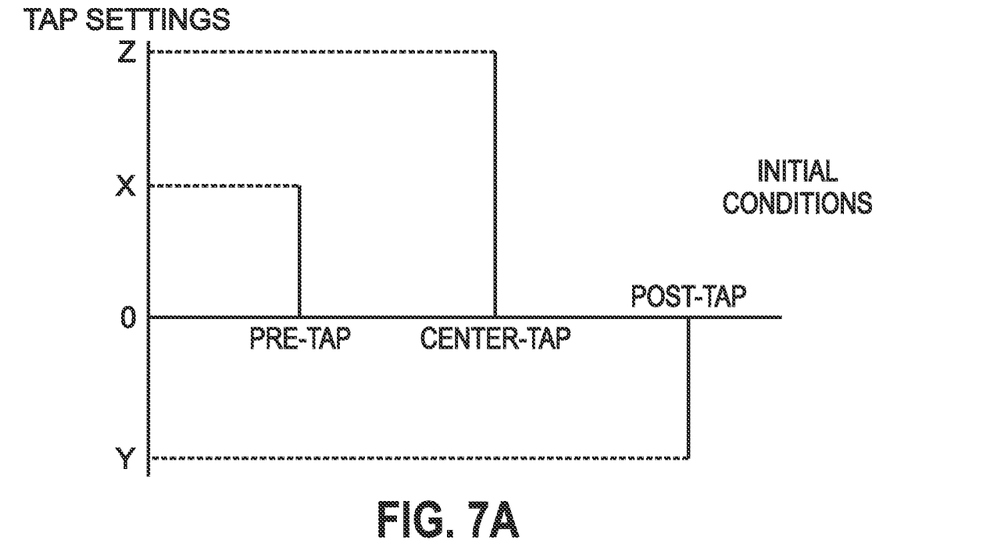
FIGS. 7A through 7H depict steps in the determination of the selected tap polarity.
Figure 7B:
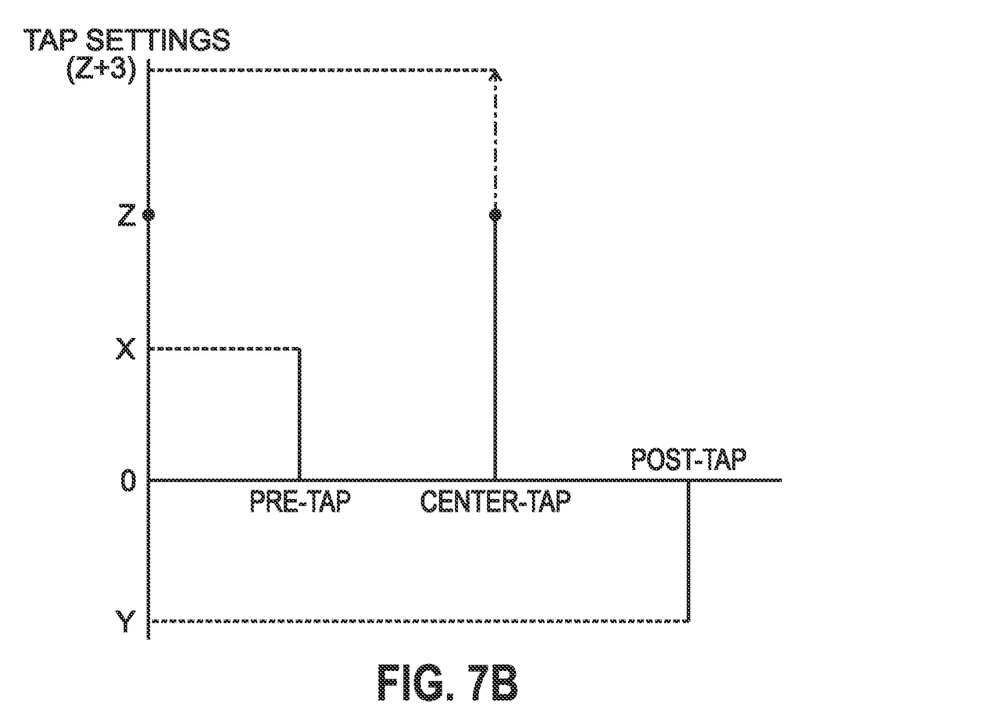
Figure 7C:
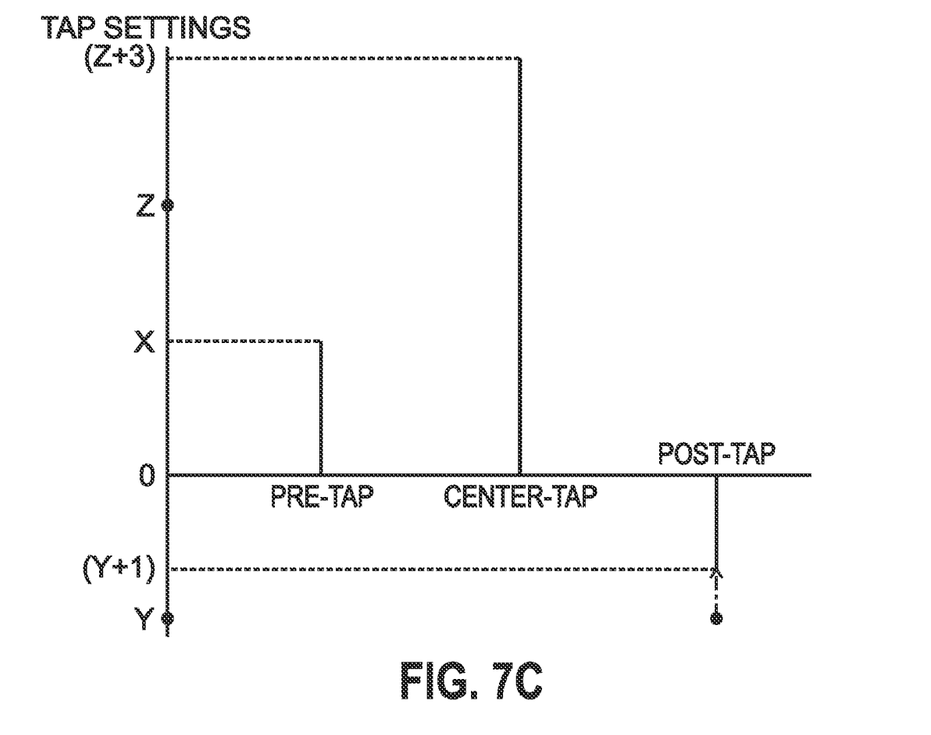

FIGS. 7A through 7H depict steps in the determination of the selected tap polarity. Assuming that post-tap is the selected tap, in FIG. 7A the gain settings of the center and post-taps, Z and Y respectively, are unknown, as is the polarity of the post-tap. In FIG. 7B the LP is directed to maximally increase the center tap gain setting until a limit signal is received (e.g., Z+3). Then in FIG. 7C, the LP is directed to move the gain setting of the post-tap one step (e.g., Y+1) with respect to a first polarity (e.g. increase gain). If a limit signal is not received, it is determined that the first polarity is in the direction of the zero setting.

Figure 7D:
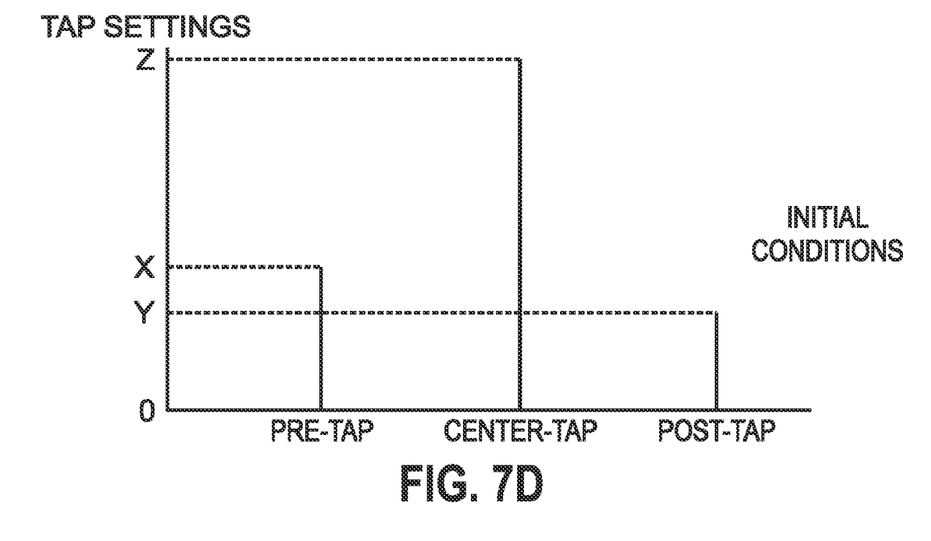
Figure 7E:
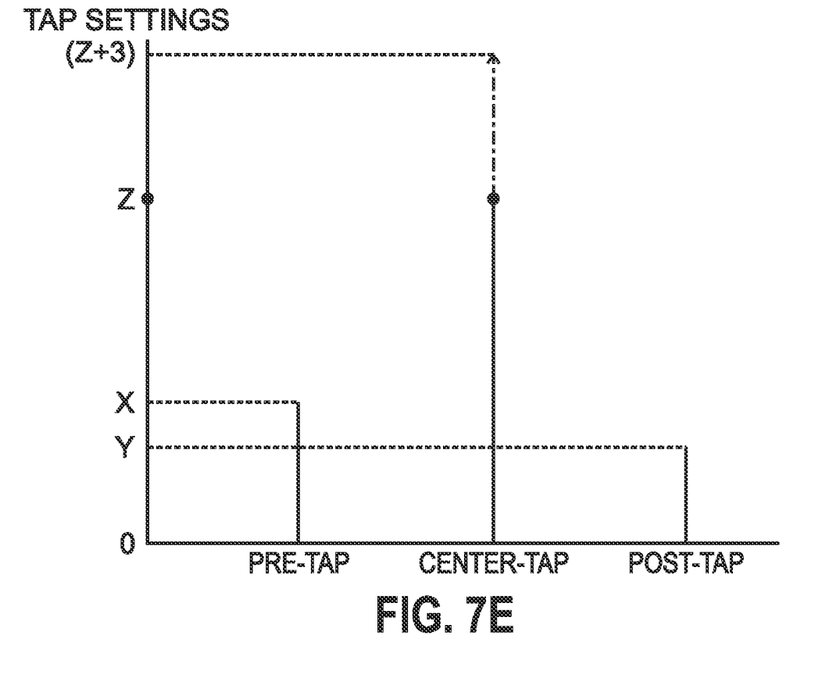
Figure 7F:
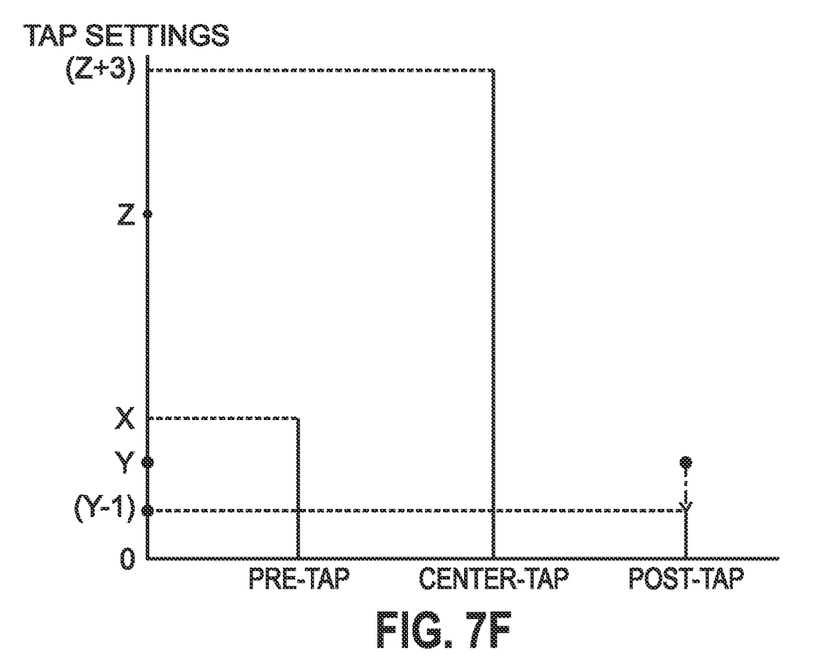

FIG. 7D is another example of an initial scenario where the gain settings of the center and post-taps are unknown, as is the polarity of the post-tap. In FIG. 7E the LP is directed to maximally increase the center tap gain setting until a limit signal is received (e.g., Z+3). Then, the LP is directed to move the gain setting of the post-tap one step (e.g., Y+1) with respect to a first polarity (e.g. increase gain). In this circumstance, since the post-tap already has a positive gain setting, a limit signal is received in response to directing the LP to move the gain setting of the selected tap one step with respect to the first polarity. Then, in FIG. 7F the LP is directed to move the gain setting of the selected tap one step (Y−1) with respect to a second polarity (e.g., decrease). If the limit signal is not received, it is determined that the second polarity is in the direction of the zero setting.

Figure 7G:
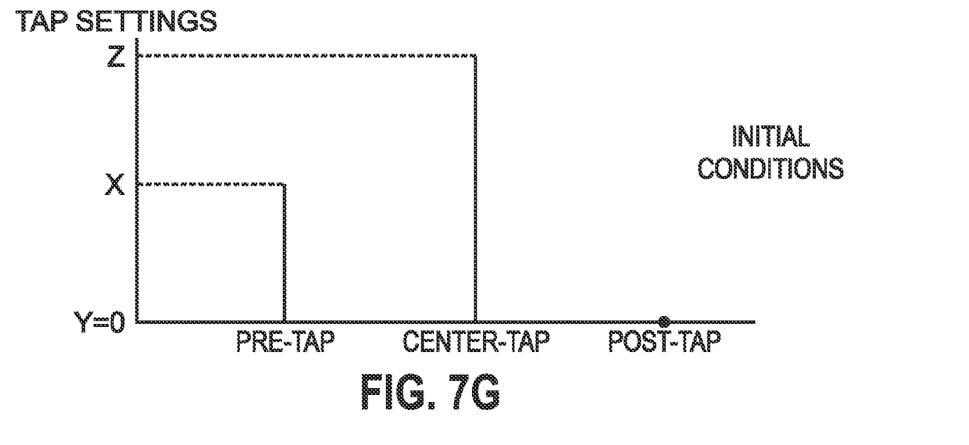
Figure 7H:
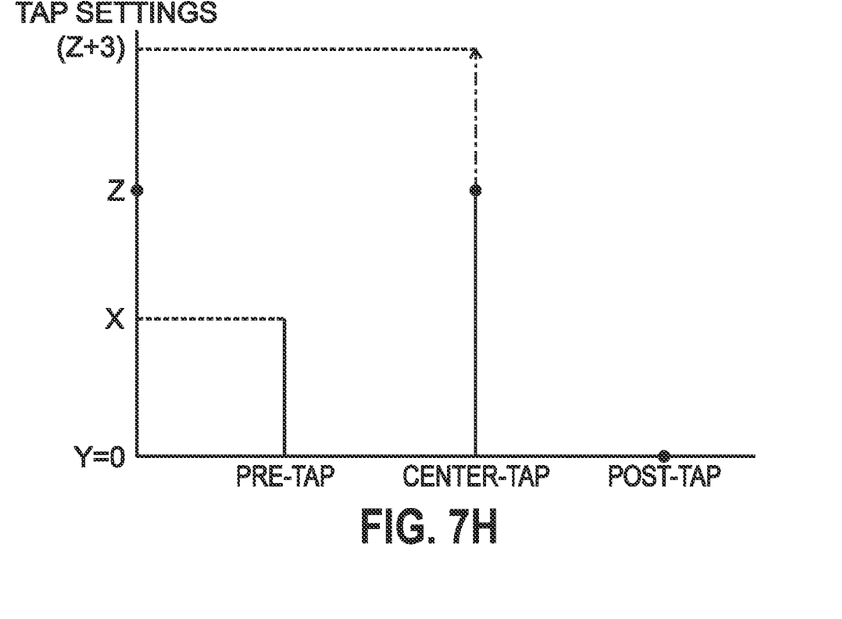

FIG. 7G is another example of an initial scenario where the gain settings of the center and post-taps are unknown, as is the polarity of the post-tap. In FIG. 7H the LP is directed to maximally increase the center tap gain setting until a limit signal is received (e.g., Z+3). Then, not shown, the LP is directed to move the gain setting of the post-tap one step (e.g., Y+1) with respect to a first polarity (e.g. increase gain), if a limit signal is received in response to directing the LP to move the gain setting of the selected tap one step with respect to the first polarity, it is determined that the current gain setting of the selected tap is the zero setting.

The above-described LD modules may be enabled in hardware using logic circuitry or programmable gate arrays. These modules may also be enabled, or partially enabled as processor software instructions stored as an application in memory (not shown), and executed by a processor (not shown).

Functional Description

The purpose of KR Training, IEEE 802.3 Clause 72, is to provide a method to alter the transmitter taps of an LP, so that an LD receiver can better acquire the incoming signal. The receiver measures the quality of the incoming signal for different transmitter tap settings. There are many different means of measuring quality. In one aspect, eye measurements are used.

The transmitter taps are in essence a filter applied to the LP transmitter. This filter shapes the transmitted signal. Depending on the characteristics of the channel and the characteristics of the receiver, the transmitter tap weights are set to different values so that the LD receives the highest quality signal possible (i.e. the best eye measurement). The LD system described in FIG. 2 acts to improve signal quality by maximizing the LP transmitter voltage, to provide a larger SNR. As for the initialize state, the KR Training system defined in IEEE 802.3 Clause 72 defines a number of commands which can be sent between a LP and a LD to change the transmitter taps. For the most part, these commands increment or decrement any one of the three taps by 1 step. There are two additional commands used to alter the taps. The first command is called 'PRESET'. When a PRESET command is received, the pre and post cursor taps are set to 0 and the center tap is set to its maximum value. The second command is called 'INIT' or initialize. These tap values set the transmitter taps to a value such that a specific ratio between all three tap levels is achieved. This ratio is defined in Clause 72. The exact value of the taps is not defined, only the ratio. When KR Training first begins, the transmitter taps must be set to the INIT values.

Figure 4:
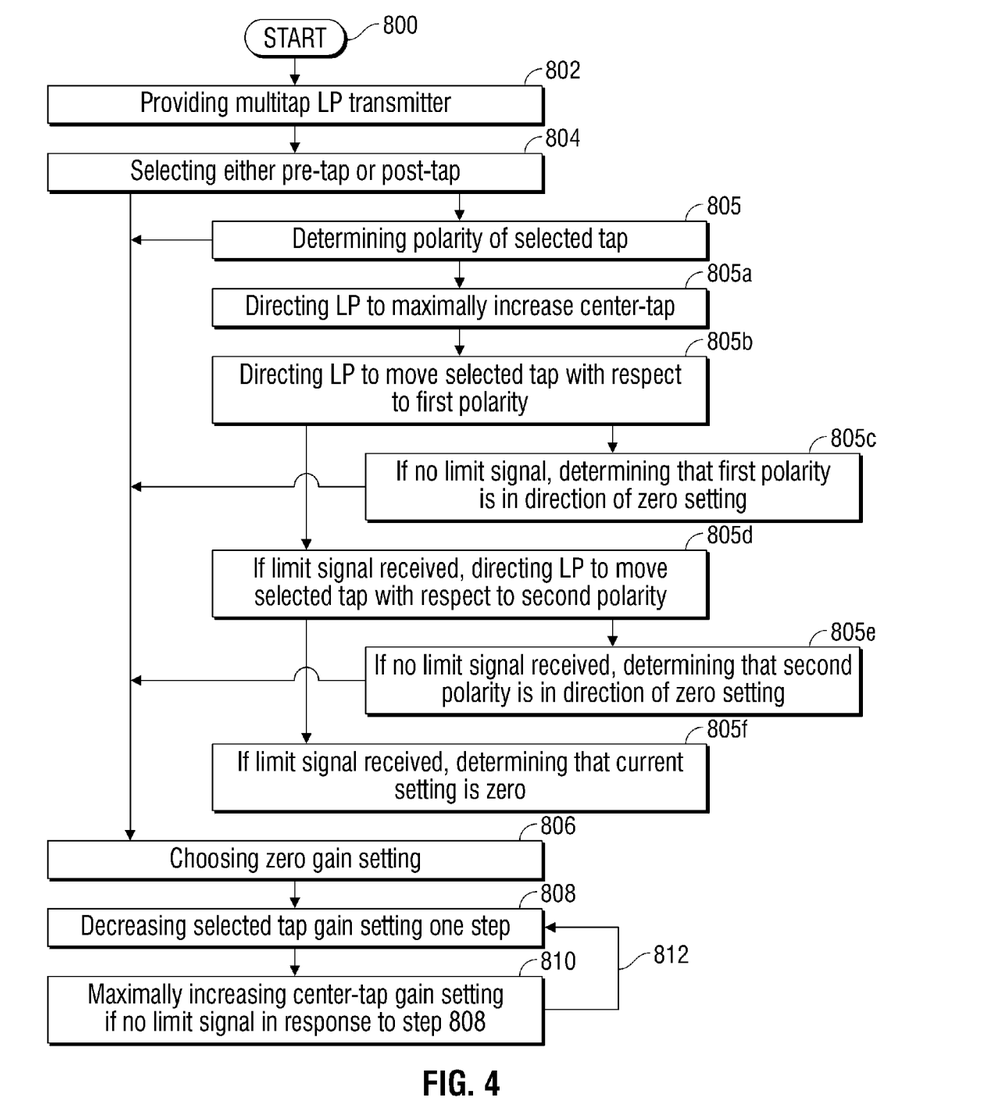
FIG. 4 is a flowchart illustrating a method for zeroing pre and post-tap settings in a link partner using a plurality of voltage gain taps.

FIG. 4 is a flowchart illustrating a method for zeroing pre and post-tap settings in a link partner using a plurality of voltage gain taps. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 provides an LP transmitter having a signal input and a plurality of parallel selectable voltage gain taps connected to the signal input. The taps include a non-delayed pre-tap, a center tap with a delay of one unit, and a post-tap with a delay of 2 units. The LP transmitter has a network-connected output to supply the sum of the taps. In Step 804 a network-connected LD selects either an LP pre-tap or post-tap. In Step 806 the LD chooses a zero gain setting for the selected LP tap. In a first iteration, the LD directs the LP to decrease the difference between the selected tap gain setting and the zero setting by 1 step (Step 808). If a limit signal is not received by the LD, Step 810 directs the LP to maximally increase the center tap gain setting until a limit signal is received. Step 812 continues the iterations until a limit signal is returned in response to the LD directing the LP to decrease the difference between the selected tap gain setting and the zero setting. In one aspect, the messages directing the LP to change the gain setting of the selected tap are sent in accordance with the IEEE 802.3, Clause 72 training procedure.

In another aspect, the method further comprises Step 805, which determines the current polarity of the selected tap. Then, directing the LP to decrease the difference between the selected tap gain setting and the zero setting by 1 step in Step 808 includes directing the LP to decrease the absolute value of the difference between the selected tap gain setting and the zero setting.

In one aspect, determining the current polarity of the selected tap in Step 805 includes substeps. Step 805a directs the LP to maximally increase the center tap gain setting until a limit signal is received. Step 805b directs the LP to move the gain setting of the selected tap one step with respect to a first polarity. If a limit signal is not received, Step 805c determines that the first polarity is in the direction of the zero setting.

If a limit signal is received in response to directing the LP to move the gain setting of the selected tap one step with respect to the first polarity (Step 805b), Step 805d directs the LP to move the gain setting of the selected tap one step with respect to a second polarity, opposite to the first polarity. If the limit signal is not received, Step 805e determines that the second polarity is in the direction of the zero setting. However, if a limit signal is received in response to directing the LP to move the gain setting of the selected tap one step with respect to the second polarity (Step 805d), Step 805f determines that the current gain setting of the selected tap is the zero setting.

A system and method have been provided for zeroing the pre and post-taps of a multitap transmitter. Examples, of particular circuitry and process flows have been given to illustrate the invention. However, the invention is not limited to merely these examples. Likewise, examples have been given in the context of an Ethernet protocol and particular data rates. Again the invention is not limited to these examples. Other variations and embodiments of the invention will occur to those skilled in the art.

I claim:

1. In a link partner using a plurality of voltage gain taps, a method for zeroing pre and post-tap settings, the method comprising:
   providing a link partner (LP) transmitter having a signal input, a plurality of parallel selectable voltage gain taps connected to the signal input, including a non-delayed pre-tap, a center tap with a delay of one unit, and a post-tap with a delay of 2 units, and a network-connected output to supply the sum of the taps;
   a network-connected local device (LD) choosing an LP tap selected from the group consisting of the pre-tap and the post-tap;
   the LD choosing a zero gain setting for the selected LP tap;
   determining the current polarity of the selected tap;
   in a first iteration, the LD directing the LP to decrease the absolute value of the difference between the selected tap gain setting and the zero setting by 1 step;
   if a zero limit signal is not received by the LD, directing the LP to maximally increase the center tap gain setting until a maximum/minimum limit signal is received, where a zero limit signal is associated with a zero tap setting, and where a maximum/minimum limit signal is associated with a maximum or minimum tap setting; and,
   continuing the iterations until a zero limit signal is returned in response to the LD directing the LP to decrease the difference between the selected tap gain setting and the zero setting;
   wherein determining the current polarity of the selected tap includes:
      directing the LP to maximally increase the center tap gain setting until a maximum/minimum limit signal is received;
      directing the LP to move the gain setting of the selected tap one step with respect to a first polarity; and,
      if a zero limit signal is not received, determining that the first polarity is in the direction of the zero setting.

2. The method of claim 1 wherein determining the current polarity of the selected tap additionally includes:
   if a zero limit signal is received in response to directing the LP to move the gain setting of the selected tap one step with respect to the first polarity, directing the LP to move the gain setting of the selected tap one step with respect to a second polarity, opposite to the first polarity; and,
   if the zero limit signal is not received, determining that the second polarity is in the direction of the zero setting.

3. The method of claim 2 wherein determining the current polarity of the selected tap additionally includes:
   if a zero limit signal is received in response to directing the LP to move the gain setting of the selected tap one step with respect to the second polarity, determining that the current gain setting of the selected tap is the zero setting.

4. The method of claim 1 wherein sending messages from the LD directing the LP to change the gain setting of a tap includes directing the LP to change the gain setting of a tap in accordance with an IEEE 802.3, Clause 72 training procedure.

5. A local device (LD) system for zeroing the pre and post-tap settings in a link partner (LP) transmitter using a plurality of voltage gain taps, the system comprising:
   an LD signal quality module having an output to supply a zero setting command for a tap selected from a group consisting of an LP pre-tap and an LP post-tap;
   an LD tap control module having an input to accept the zero setting command and a network interface to supply a sequence of tap modification signals to an LP transmitter having a plurality of parallel selectable voltage gain taps connected to a signal input, including a non-delayed pre-tap, a center tap with a delay of one unit, and a post-tap with a delay of 2 units, and a network-connected output to supply the sum of the taps, the LD tap control module sending a sequence of tap modification signals including directions to:
   determine the current polarity of the selected tap;
   in a first iteration, decrease the absolute value of the difference between the selected tap gain setting and the zero setting by 1 step;
   if a zero limit signal is not received by the LD tap control module, directing the LP to maximally increase the center tap gain setting until a maximum/minimum limit signal is received, where a zero limit signal is associated with a tap zero setting, and where a maximum/minimum limit signal is associated with a maximum or minimum tap setting;
   continuing the iterations until a zero limit signal is returned in response to the LD tap control module directing the LP to decrease the difference between the selected tap gain setting and the zero setting;
   wherein the LD tap control module determines the current polarity of the selected tap as follows:
      directing the LP to maximally increase the center tap gain setting until a maximum/minimum limit signal is received;
      directing the LP to move the gain setting of the selected tap one step with respect to a first polarity; and,
      if a zero limit signal is not received, determining that the first polarity is in the direction of the zero setting.

6. The system of claim 5 wherein the LD tap control module additionally determines the current polarity of the selected tap additionally by:
   if a zero limit signal is received in response to directing the LP to move the gain setting of the selected tap one step with respect to the first polarity, directing the LP to move the gain setting of the selected tap one step with respect to a second polarity, opposite to the first polarity; and, if the zero limit signal is not received, determining that the second polarity is in the direction of the zero setting.

7. The system of claim 6 wherein the LD tap control module additionally determines the current polarity of the selected tap additionally by:

if a zero limit signal is received in response to directing the LP to move the gain setting of the selected tap one step with respect to the second polarity, determining the current gain setting of the selected tap is the zero setting.

8. The system of claim 5 wherein the LD tap control module sends tap change commands in accordance with an IEEE 802.3, Clause 72 training procedure.

* * * * *